July 25, 1967 MASAMITSU KAWAKAMI 3,333,115

FIELD-EFFECT TRANSISTOR HAVING PLURAL INSULATED-GATE ELECTRODES THAT VARY SPACE-CHARGE VOLTAGE AS A FUNCTION OF DRAIN VOLTAGE

Filed Nov. 19, 1964

INVENTOR.
Masamitsu Kawakami

BY

Mestern, Ross & Mestern

United States Patent Office 3,333,115

Patented July 25, 1967

3,333,115

FIELD-EFFECT TRANSISTOR HAVING PLURAL INSULATED-GATE ELECTRODES THAT VARY SPACE-CHARGE VOLTAGE AS A FUNCTION OF DRAIN VOLTAGE

Masamitsu Kawakami, Tokyo-to, Japan, assignor to Toko Kabushiki Kaisha, Ota-ku, Tokyo-to, Japan, a joint-stock company of Japan Filed Nov. 19, 1964, Ser. No. 412,376

Claims priority, application Japan, Nov. 20, 1963, 38/62,405

2 Claims. (Cl. 307—88.5)

ABSTRACT OF THE DISCLOSURE

Field-effect transistor with a source electrode, a drain electrode and two gate electrodes, at least the second gate electrode (closer to the drain electrode) being separated from the semiconductive transistor body by a dielectric layer, this second gate electrode being maintained at a potential varying with the load voltage by being tied to an intermediate tap of a voltage divider connected across the source and drain electrodes whereby, upon application of a signal between the first gate electrode and the source electrode, capacitive feedback from the load circuit to the input circuit is reduced.

This invention relates to semiconductor amplifier devices and more particularly to improvements in and relating to field-effect transistors.

A typical field-effect transistor comprises a substrate of a semiconductor body of one conductivity type, a source electrode applied to one end thereof, a drain electrode applied to the opposite end of the semiconductor body, and a gate electrode applied to the surface of the semiconductor body between the source and drain electrodes. The gate electrode is used to create a field effect to control the current flowing through the semiconductor body between the source and drain electrodes. However, it was found that, in the field-effect transistor of the type referred to above, the feedback electrostatic capacitance between the gate electrode and the drain electrode is excessive and that the internal resistance as well as the output resistance of the transistor are too low.

It is an object of this invention to eliminate these defects.

The invention and some of its features may be better understood from the following detailed description taken in connection with the accompanying drawing in which.

Figure 1:
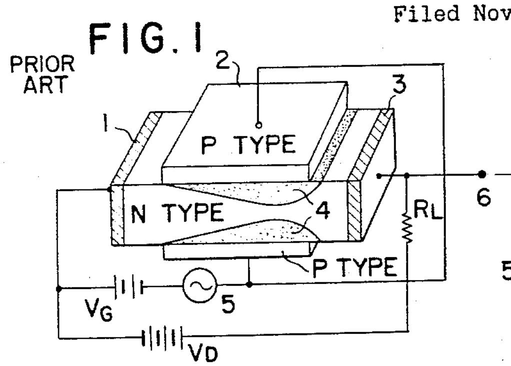
FIG. 1 shows a diagram to explain the operation of a single-pole transistor.

In order to facilitate a full understanding of this invention, a conventional field-effect transistor will be first considered. FIG. 1 represents one type of field-effect transistor known in the art as a single-pole transistor. As shown, a source electrode 1 and a drain electrode 3 are respectively secured to the opposite ends of a semiconductor of one conductivity type (N type in the illustrated example) to pass electric current therebetween. A gate electrode 2 is provided between the source and drain electrodes to control this current. The gate 2 in the illustrated example is of the P type to form a PN junction between the gate electrode 2 and the source electrode 1. Generally, a bias potential is applied to the transistor in the reverse direction. Thus, the source electrode 1, the gate electrode 2 and the drain electrode 3 correspond to a cathode electrode, a control grid and an anode electrode, respectively, of a three-electrode vacuum tube. In FIG. 1, reference numeral 4 indicates space-charge regions created by the gate electrode 2.

Figure 2:
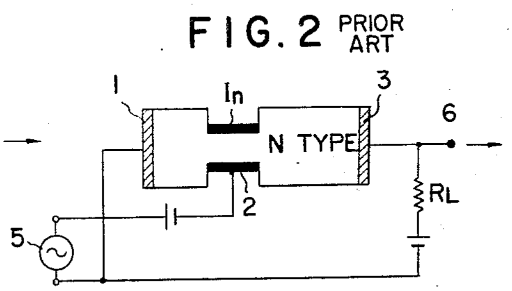
FIG. 2 shows a diagram to explain the operation of a tecnetron.
Figures 3, 4, 5:
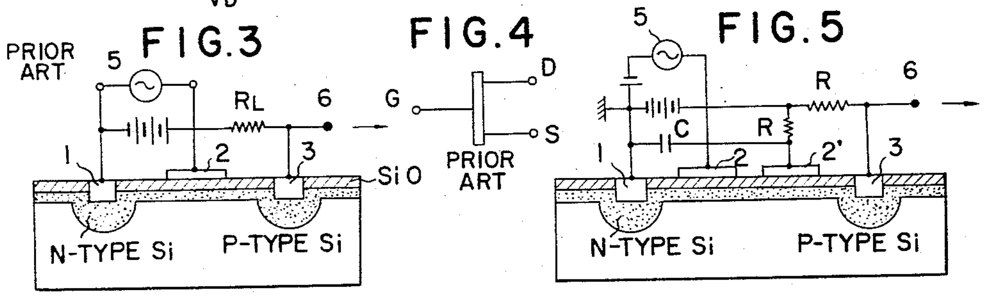
FIG. 3 is a diagram to explain the operation of a metal-oxide semiconductor transistor.
FIG. 4 is a diagram indicating symbols for a field-effect transistor.
FIG. 5 is a circuit diagram of one embodiment of this invention wherein a two-gate field-effect transistor is utilized as an amplifier circuit.

FIG. 2 shows one type of field-effect transistor known as a "tecnetron" which comprises a semiconductor of one conductivity type (N type, in the illustrated example), a cathode electrode 1 and an anode electrode 3 provided on the opposite ends of the semiconductor to pass current therethrough. The intermediate section of the semiconductor is made thinner than the remaining parts, and a trivalent element, for instance, In, is welded to this section to form a PN junction which acts as a gate electrode 2 to control current flowing through the semiconductor. Throughout the drawing, reference character $R_L$ designates a load, 5 a source of input signal, and 6 an output terminal. In FIG. 5, R designates a resistor for producing a voltage drop, and C a bypass capacitance for signal components.

FIG. 3 shows a metal-oxide semiconductor (hereinafter abbreviated as MOS) transistor comprising a substrate of P-type silicon, an N-type source electrode 1 and a drain electrode 3 which are formed on the substrate by diffusion, and a gate electrode 2 intermediately disposed between the source and drain electrodes and connected to them through an N-type channel. In the construction shown, as the gate electrode 2 provides control function through an insulator layer of $SiO_2$, the polarity of the biasing potential for this electrode may be either positive or negative with respect to the source electrode 1.

FIG. 4 is a symbolic representation of these field-effect transistors, with reference letters S, G and D denoting the source, gate and drain electrodes, respectively.

The three types described above are typical field-effect transistors which have already been disclosed. While these field-effect transistors are characterized by extremely high input resistance (which is higher than that of vacuum tubes), when used in amplifier circuits they are disadvantageous in that:

(1) The feedback electrostatic capacitance between the drain electrode 3 and the gate electrode 2 is about 2 to 3 pf.; and (2) The output resistance and internal resistance are relatively low, i.e., at most from 10 to 100 kilo-ohms.

Accordingly, it is the principal object of this invention to provide an ideal amplifier element free from these defects.

In accordance with this invention this object is attained by providing two gate electrodes, one for controlling and the other for acceleration, for example. With this arrangement, to be described more fully hereinafter, it is possible to decrease greatly the feedback electrostatic capacitance and increase the internal resistance while maintaining the input impedance and mutual conductance the same as those in the devices utilizing a single gate electrode. It is possible to provide two gate electrodes in any type of field effect transistor.

Figure 6:
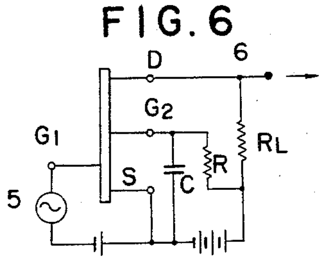
FIG. 6 is a connection diagram of a circuit shown in FIG. 5.

FIG. 5 illustrates a MOS transistor provided with two gate electrodes in accordance with this invention. In addition to a source electrode 1, a gate electrode 2 and a drain electrode 3, a second gate electrode 2' is added between the first gate electrode 2 and the drain electrode 3. The second gate electrode 2' is supplied with a D-C acceleration voltage and grounded through a capacitance to provide a bypass for the alternating-current component. It will be apparent that the device shown in FIG. 4 has improved characteristics with respect to feedback capacitance and the internal resistance, when it is considered as corresponding to a four-electrode vacuum tube (a four-electrode tube without secondary electrons, or, essentially, a pentode). FIG. 6 shows a connection diagram for the device shown in FIG. 5.

The above-mentioned second gate electrode can be used not only as a mere acceleration electrode but also to provide control function.

Figure 7:
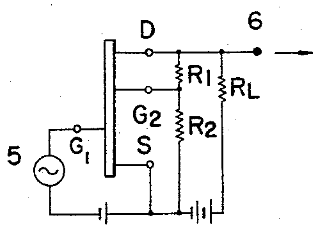
FIG. 7 shows a connection diagram of a modified amplifier circuit of this invention utilizing a two-gate field-effect transistor.

FIG. 7 illustrates one example of such an application wherein a fraction of the output voltage provided by potentiometer resistors $R_1$ and $R_2$ is impressed upon the second gate electrode $G_2$. Such an amplifier device is advantageous in that, in comparison with an amplifier with a single gate electrode, it affords approximately twice the voltage-amplification factor and also twice the maximum output voltage.

Figure 8:
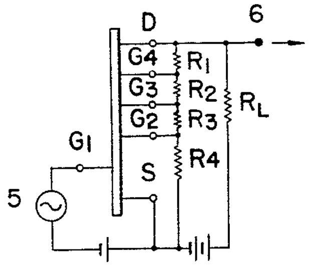
FIG. 8 shows a connection diagram of another embodiment of this invention utilizing a four-gate field-effect transistor.

FIG. 8 illustrates an embodiment of this invention wherein four gate electrodes are used. Thus, by increasing the number of gate electrodes to *n*, and by applying to these electrodes feedback potentials from the output potential, it is possible to obtain a voltage-amplification factor and a maximum output voltage which are both *n* times larger than those of the amplifier having only one gate electrode. The device embodying this invention is far smaller and less expensive than an amplifier device including *n* transistors connected in cascade.

Figure 9:
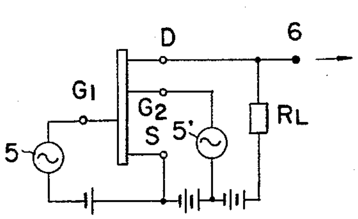
FIG. 9 shows a connection diagram of a modulator circuit constructed in accordance with this invention wherein a two-gate field-effect transistor is utilized.

FIG. 9 illustrates a modulator circuit which embodies a third application of this invention. In this case, signals of different frequencies derived from sources 5 and 5' are applied to the first and second gate electrodes, respectively to provide a conveniently modulated wave output.

While the invention has been described in connection with three types of field-effect transistors, it should be understood that the invention can equally be applied to any type of field-effect transistor and that many modifications and alterations can be made therein without departing from the true spirit and scope of the invention as defined in the appended claims.

What I claim is:

1. A semiconductor amplifier comprising a field-effect transistor with a body having a continuous zone of one conductivity type, a source electrode and a drain electrode contacting said zone at spaced locations, a first gate electrode relatively close to said source electrode contacting said body between said source and drain electrodes, said body having a portion of opposite conductivity type adjoining said zone in an intermediate region between said source and drain electrodes, a dielectric layer adjoining said zone in said intermediate region and confronting said portion of opposite conductivity type across said zone, at least one second gate electrode relatively remote from said source electrode contacting said layer in capacitively coupled relationship with said zone, a control circuit including a source of signals connected between said source electrode and said first gate electrode, a load circuit including a source of direct current connected between said source electrode and said drain electrode, and a biasing circuit connected between said load circuit and said second gate electrode, said biasing circuit including a voltage divider connected across said drain and source electrodes, said second gate electrode being connected to an intermediate point on said voltage divider whereby the potential of said second gate electrode varies proportionally with that of said drain electrode.

2. A semiconductor amplifier as defined in claim 1 wherein said first gate electrode also contacts said layer in capacitively coupled relationship with said zone.

References Cited

UNITED STATES PATENTS

| | | | |
|---|---|---|---|
| 2,805,397 | 9/1957 | Ross | 307—88.5 |
| 2,836,797 | 5/1958 | Ozarow | 307—88.5 |
| 3,153,154 | 10/1964 | Murray et al. | 307—88.5 |

OTHER REFERENCES

Electronics, June 14, 1963, vol. 36, pp. 43–45.

ARTHUR GAUSS, *Primary Examiner.*

J. HEYMAN, *Assistant Examiner.*